(12) United States Patent
Oh et al.

(10) Patent No.: US 12,431,491 B2
(45) Date of Patent: Sep. 30, 2025

(54) SILICON OXIDE COMPOSITE FOR LITHIUM SECONDARY BATTERY ANODE MATERIAL AND METHOD FOR MANUFACTURING SAME

(71) Applicant: DAEJOO ELECTRONIC MATERIALS CO., LTD., Siheung-Si (KR)

(72) Inventors: Seung Min Oh, Siheung-Si (KR); Jeong Gyu Park, Siheung-Si (KR); Hyeon Soo Park, Siheung-Si (KR); Young Min Jeon, Siheung-Si (KR); Jong Chan Lim, Siheung-Si (KR)

(73) Assignee: DAEJOO ELECTRONIC MATERIALS CO., LTD., Siheung-si (KR)

( * ) Notice: Subject to any disclaimer, the term of this patent is extended or adjusted under 35 U.S.C. 154(b) by 882 days.

(21) Appl. No.: 17/607,462

(22) PCT Filed: Apr. 29, 2020

(86) PCT No.: PCT/KR2020/095081
§ 371 (c)(1),
(2) Date: Oct. 29, 2021

(87) PCT Pub. No.: WO2020/222628
PCT Pub. Date: Nov. 5, 2020

(65) Prior Publication Data
US 2022/0209228 A1    Jun. 30, 2022

(30) Foreign Application Priority Data

Apr. 29, 2019    (KR) .................. 10-2019-0049943

(51) Int. Cl.
*H01M 4/48*    (2010.01)
*H01M 4/02*    (2006.01)
(Continued)

(52) U.S. Cl.
CPC ............... *H01M 4/48* (2013.01); *H01M 4/04* (2013.01); *H01M 4/131* (2013.01);
(Continued)

(58) Field of Classification Search
CPC ...... H01M 4/131; H01M 4/134; H01M 4/362; H01M 4/364; H01M 4/366; H01M 4/386; H01M 4/48; H01M 4/5825
See application file for complete search history.

(56) References Cited

U.S. PATENT DOCUMENTS

2016/0372753 A1\* 12/2016 Fukasawa ........... H01M 10/052
2018/0269475 A1\*  9/2018 Oh ..................... H01M 4/364
2020/0168890 A1\*  5/2020 Choi .................... H01M 4/133

FOREIGN PATENT DOCUMENTS

CN    104145357 A    11/2014
CN    108630887 A    10/2018
(Continued)

OTHER PUBLICATIONS

Notification of the First Office Action dated Oct. 24, 2023 issued in Chinese Patent Appication No. 202080047825.2, 14 pages.
(Continued)

*Primary Examiner* — Brittany L Raymond
(74) *Attorney, Agent, or Firm* — Scully, Scott, Murphy & Presser, P.C.

(57) ABSTRACT

The present invention relates to a silicon oxide composite for a lithium secondary battery anode material and a method for manufacturing same and, more specifically, to a silicon oxide composite for a lithium secondary battery anode material and a method for manufacturing same, wherein the silicon oxide composite comprises a Si cluster and $Mg_xSiO_y$ ($0 \leq x \leq 3$, $0 \leq y \leq 5$) formed on a peripheral portion of the Si cluster.

12 Claims, 17 Drawing Sheets

(51) Int. Cl.
    *H01M 4/04*         (2006.01)
    *H01M 4/131*       (2010.01)
    *H01M 4/1391*     (2010.01)
    *H01M 4/36*         (2006.01)
    *H01M 10/052*     (2010.01)

(52) U.S. Cl.
    CPC ......... *H01M 4/1391* (2013.01); *H01M 4/364* (2013.01); *H01M 10/052* (2013.01); *H01M 2004/021* (2013.01)

(56) References Cited

FOREIGN PATENT DOCUMENTS

| | | |
|---|---|---|
| EP | 3379611 A1 | 9/2018 |
| KR | 10-2017-0082264 A | 7/2017 |
| KR | 10-2017-0137000 A | 12/2017 |
| KR | 10-2018-0124769 A | 11/2018 |
| KR | 10-2019-0030676 A | 3/2019 |
| KR | 10-2012-0104759 A | 9/2019 |
| WO | WO 2018-208111 | * 11/2018 |

OTHER PUBLICATIONS

DATABASE WPI Week 201880 Thomson Scientific, London, GB; An 2018-89685M & WO 2018/208111 A1 (LG Chem LTD) Nov. 15, 2018, 2 pages.

DATABASE WPI Week 201825 Thomson Scientific, London, GB; AN 2018-25851 E & Jp 6 306767 B1 (Daejoo Electronic Material Co LTD) Apr. 4, 2018, 3 pages.

Office Action dated Sep. 4, 2023 issued in European Patent Application No. 20799342.9, 7 pages.

International Search Report dated Aug. 12, 2020 issued in PCT/KR2020/095081, 2 pages.

* cited by examiner

SILICON OXIDE COMPOSITE FOR LITHIUM SECONDARY BATTERY ANODE MATERIAL AND METHOD FOR MANUFACTURING SAME

BACKGROUND OF THE DISCLOSURE

Field of the Disclosure

The present disclosure relates to a silicon oxide composite for a lithium secondary battery anode material and a method for manufacturing same and, more specifically, to a silicon oxide composite for a lithium secondary battery anode material and a method for manufacturing same, in which the silicon oxide composite comprises a Si cluster and $Mg_xSiO_y$, ($0 \leq x \leq 3$, $0 \leq y \leq 5$) formed on a peripheral portion of the Si cluster within the particles.

Related Art

As the necessity of secondary batteries is standing out for miniaturization and high performance of portable devices and even in the industries of electric vehicles and large capacity energy storage, demand for improving performance of lithium secondary batteries is increasing these days. In order to increase energy density, research and development are underway with a focus on large capacity of positive and negative active materials, high densification of electrode plates, thinning of separators, elevation of charge/discharge voltages, etc.

However, since thinning of separators, high densification of electrode plates, and elevation of charge/discharge voltages may cause fatal problems in the stability of secondary batteries, the research and development currently face technical limitations, and thus, are now being heavily focused on the direction of increasing capacities of cathode and anode active materials.

In particular, anode active materials which are capable of exhibiting capacities equal to or several times greater than 372 mAh/g (i.e., the theoretical capacity of conventional graphite-based materials) have been reported. As conventional anode active materials for lithium secondary batteries, carbon-, silicon-, tin-based, transition metal oxides, etc. have been mainly studied. However, anode active materials developed thus far have not yet reached the desired levels with regard to capacity, initial charge/discharge efficiency, expansion rate, and lifetime characteristics, and thus, there is a lot of room for improvement.

In particular, materials, such as Si, Ge, and Sn with a large theoretical capacity, are being spotlighted as new anode materials. Among them, silicon, due to its high theoretical capacity of 4,200 mAh/g, has been spotlighted as a next generation material to replace the carbon-based anode materials. Silicon shows a large capacity as the alloy is formed with a high capacity by accommodating 4.4 lithium atoms per silicon atom, however, due to such a characteristic, it also undergoes a change in volume by 300% or higher. Such a change in volume generates pulverization of an anode active material as charge/discharge is continued, and causes electrical deionization of the anode active material from a current collector. This electrical deionization significantly reduces the capacity maintaining rate of a given battery.

In an effort to remedy such a problem, there has been proposed a technique which includes complicating silicon with carbon through a mechanical milling process and cladding surfaces of silicon particles with a carbon layer by way of a chemical vapor deposition (CVD) (Patent Document 1). However, this technology has a limitation in terms of controlling volume expansion and contraction accompanied by the charge/discharge process. In contrast, silicon oxide ($SiO_x$), although having a smaller capacity than silicon, has been spotlighted because it has a several times larger capacity (about 1,500 mAh/g) compared to that of a carbon-based anode (about 350 mAh/g), and has a remarkable improvement in the characteristics of a volume expansion rate and its lifetime (a capacity maintaining rate) due to a structure where silicon nanocrystals are uniformly distributed on a silicon dioxide matrix.

However, silicon oxide with an excellent lifetime and capacity as such, generates a lithium oxide (including a lithium oxide and a lithium silicic acid) by a reaction with lithium during the initial charge, and the thus-generated lithium oxide is prevented from being reversibly returned to a cathode during discharge. Therefore, there have been problems in that the non-reversible reaction causes loss of lithium, decreases the initial charge/discharge efficiency (ICE) to 75% or less, and offsets a large capacity per unit mass of an anode in an actual battery because an excessive capacity of a cathode is necessary for designing a secondary battery. As one of the methods for improving the initial charge/discharge efficiency of silicon oxide ($SiO_x$), there is a method of manufacturing a $Si$—$SiO_x$—$Li$ based complex by reacting $SiO_x$ with metallic lithium powder (Patent Document 2). Although this method can improve the initial charge/discharge efficiency, it has problems in that the capacity of a battery is reduced, the stability of a paste is degraded in manufacturing electrodes, and its industrial production is difficult due to the difficulty in handling the same.

As a method to improve the stability during the manufacture of electrodes, there has been a method of increasing the initial charge/discharge efficiency though a silicon-silicon oxide composite by mixing and heating $SiO_x$ and a magnesium compound. Patent Document 3 discloses a method of manufacturing a $Si$—$SiO_2$—$Mg_2SiO_4$-carbon-based composite material by reacting $SiO_2$ with magnesium nitrate, $(Mg(NO_3)O_2$, where the discharge capacity of 900 mAh/g and the initial charge/discharge efficiency of 73% were shown to be low. These results may be interpreted as that since magnesium nitrate is used as a precursor for magnesium, non-crystalline $SiO_2$ and MgO are contained in large amounts during a reaction with $SiO_2$, thus not being able to prevent the occurrence of an irreversible reaction and also resulting in a low expression of the charge/discharge capacity contrary to the expectation.

Further, in order to reduce the irreversibility of $SiO_2$, there has been reported a method of manufacturing a silicon-silicon oxide composite, which contains magnesium or calcium by reacting $SiO_2$ powder with magnesium hydride ($MgH_2$) or calcium hydride ($CaH_2$) (Patent Document 4). Although this method can reduce the degree of mixed introduction of oxygen during the reaction between the $SiO_2$ powder with $MgH_2$ or $CaH_2$, the size of silicon crystals grows rapidly due to a local exothermic reaction and Mg or Ca is distributed in a non-uniform manner, thus reducing the capacity maintaining rate compared to $SiO_2$.

SUMMARY

In order to solve the problems of the related art described above, an object of the present disclosure is to provide a silicon oxide composite for a lithium secondary battery anode material with a novel structure, which has a high capacity maintaining rate and exhibits a high capacity, by including $Mg_xSiO_y$ (0<x≤3, 0<y≤5) formed on the peripheral portion of the Si cluster while simultaneously forming a Si cluster within particles in a particle forming process, by way of evaporating a $Si/SiO_x/SiO_2$ raw material powder mixture and magnesium and allowing them to react in a gaseous state.

An object of the present disclosure is to also provide a method of manufacturing a silicon oxide composite for a lithium secondary battery anode material by a silicon oxide composite for a lithium secondary battery anode material.

In order to solve the problems described above, the present disclosure provides a silicon oxide composite for a lithium secondary battery anode material, which includes a Si cluster; and magnesium silicate, which is indicated as $Mg_xSiO_y$ (0.5≤x≤2, 2.5≤y≤4), formed on a peripheral portion of the Si cluster.

The Si cluster and the $Mg_xSiO_y$ (0.5≤x≤2, 2.5≤y≤4) formed on a peripheral portion of the Si cluster can form a core shell structure.

The domain size of Si (220) in the Si cluster may be 12 nm or less.

With regard to the silicon oxide composite for a lithium secondary battery anode material of the present disclosure, in X-ray diffraction pattern analysis, a peak belonging to a Si crystal may appear in a range of a diffraction angle 28°<2θ<29°, and a peak belonging to a $MgSiO_3$ crystal may appear in a range of a diffraction angle 30.5°<2θ<31.5°.

With regard to the silicon oxide composite for a lithium secondary battery anode material of the present disclosure, in an X-ray diffraction pattern analysis, a full width at half maximum (FWHM) of Si (111) by the Si cluster may be in a range of 0.7 (deg) to 1.5 (deg).

The silicon oxide composite for a lithium secondary battery anode material of the present disclosure may include a $Mg_2SiO_4$ (forsterite) crystal, and the content of the $Mg_2SiO_4$ (forsterite) crystal may be smaller than that of a $MgSiO_3$ (enstatite) crystal.

With regard to the silicon oxide composite for a lithium secondary battery anode material of the present disclosure, the peak intensity ratio between the $Mg_2SiO_4$ (forsterite) crystal phase and the $MgSiO_3$ (enstatite) crystal phase (i.e., $I_{Mg2SiO4}/I_{MgSiO3}$) may be in a range of 0 to 0.5 or less.

The silicon oxide composite for a lithium secondary battery anode material of the present disclosure may include Mg in a ratio of 2 to 15 parts by weight, and preferably 2 to 10 parts by weight relative to 100 parts by weight of the total.

The silicon oxide composite for a lithium secondary battery anode material of the present disclosure may include a carbon film on a surface thereof.

With regard to the silicon oxide composite for a lithium secondary battery anode material of the present disclosure, an average thickness of the carbon film may be in a range of 5 nm to 100 nm.

Additionally, the present disclosure may further provide a method of manufacturing a silicon oxide composite for a secondary battery anode material according to the present disclosure, which includes:

mixing silicon powder, silicon oxide ($SiO_x$, 0.9<x<1.1) powder, and silicon dioxide powder to prepare a $Si/SiO_x/SiO_2$ raw material powder mixture;

evaporating the $Si/SiO_x/SiO_2$ raw material powder mixture and metallic magnesium, respectively, reacting them, and then depositing the resultant to form an oxide composite;

cooling the formed silicon oxide composite; and milling the cooled silicon oxide composite.

The method of manufacturing a silicon oxide composite for a secondary battery anode material of the present disclosure may further include a step of cladding a surface of the milled silicon oxide composite with carbon.

With regard to the method of manufacturing a silicon oxide composite for a secondary battery anode material of the present disclosure, in the step of mixing the silicon powder, silicon oxide ($SiO_x$, 0<x<1.1) powder, and silicon dioxide powder to prepare a $Si/SiO_x/SiO_2$ raw material powder mixture, the molar ratio of O/Si in the $Si/SiO_x/SiO_2$ raw material powder mixture may be in a range of 0.9 to 1.1.

With regard to the method of manufacturing a silicon oxide composite for a secondary battery anode material of the present disclosure, in the step of mixing the silicon powder, silicon oxide ($SiO_x$, 0<x<1.1) powder, and silicon dioxide powder to prepare a $Si/SiO_x/SiO_2$ raw material powder mixture, an average particle diameter and a specific surface area of the silicon powder, silicon oxide ($SiO_x$, 0<x<1.1) powder, and silicon dioxide powder to be included as raw materials may be in a range of 10 nm to 100 μm and 5 $m^2/g$ to 500 $m^2/g$, respectively.

With regard to the method of manufacturing a silicon oxide composite for a secondary battery anode material of the present disclosure, after the step of mixing the silicon powder, silicon oxide ($SiO_x$, 0<x<1.1) powder, and silicon dioxide powder to prepare a $Si/SiO_x/SiO_2$ raw material powder mixture, the method may further include a step of subjecting the $Si/SiO_x/SiO_2$ raw material powder mixture to heat treatment at 800° C. to 1,100° C. under normal pressure for 1 to 3 hours.

With regard to the method of manufacturing a silicon oxide composite for a secondary battery anode material of the present disclosure, in the step of evaporating the $Si/SiO_x/SiO_2$ raw material powder mixture and metallic magnesium, respectively, reacting them, and then depositing the resultant to form an oxide composite, the $Si/SiO_x/SiO_2$ raw material powder mixture and the metallic magnesium may be evaporated in separate reactors, respectively, and reacted in a gaseous state.

With regard to the method of manufacturing a silicon oxide composite for a secondary battery anode material of the present disclosure, in the step of evaporating the $Si/SiO_x/SiO_2$ raw material powder mixture and metallic magnesium, respectively, reacting them, and then depositing the resultant to form an oxide composite, the $Si/SiO_x/SiO_2$ raw material powder mixture may be evaporated at 1,000° C. to 1,600° C. under a pressure of 0.001 torr to 5 torr.

With regard to the method of manufacturing a silicon oxide composite for a secondary battery anode material of the present disclosure, in the step of evaporating the $Si/SiO_x/SiO_2$ raw material powder mixture and metallic magnesium, respectively, reacting them, and then depositing the resultant to form an oxide composite, the metallic magnesium may be evaporated at 700° C. to 1,000° C. under a pressure of 0.001 torr to 2 torr.

With regard to the method of manufacturing a silicon oxide composite for a secondary battery anode material of the present disclosure, in the step of cladding the surface with carbon, the silicon oxide composite may be reacted with one or more carbon precursors selected from the group consisting of methane, propane, butane, acetylene, benzene, and toluene at 600° C. to 1,200° C. in a gaseous state.

The present disclosure also provides the anode for a lithium secondary battery according to the present disclosure, which is provided with the silicon oxide composite for a secondary battery anode material.

The present disclosure also provides the lithium secondary battery according to the present disclosure, which includes an anode for a lithium secondary battery provided with a silicon oxide composite for a secondary battery anode material.

With regard to the anode for a lithium secondary battery according to the present disclosure, when the battery is charged twice, the peak in the vicinity of 0.45 V in the dQ/dV curve may appear to be greater than that at 0.25 V.

With regard to the lithium secondary battery including the anode for a lithium secondary battery according to the present disclosure, after the battery is discharged twice, the XRD peak derived from $Mg_xSiO_y$ may not appear.

Advantageous Effects

The silicon oxide composite for a lithium secondary battery anode material of the present disclosure is a silicon oxide composite for a lithium secondary battery anode material with a novel structure, which includes $Mg_xSiO_y$ (0≤x≤3, 0≤y≤5) formed on a peripheral portion of the Si cluster while simultaneously forming a Si cluster within the particles; therefore, the silicon oxide composite has remarkably high capacity maintaining rate while exhibiting a higher capacity to the conventional secondary battery anode materials.

DESCRIPTION OF EXEMPLARY EMBODIMENTS

Hereinafter, the present disclosure will be described in more detail through embodiments. Since these embodiments are merely for illustrating the present disclosure, the scope of the present disclosure is not to be construed as being limited by these embodiments.

As used herein, an expression such as "comprising/including" should be understood as an open-ended term containing the possibility of including other Examples, unless otherwise specifically stated in the phrase or sentence in which the expression is included.

As used herein, "preferred" and "preferably" refer to embodiments of the present disclosure that may provide certain advantages under certain circumstances. However, other embodiments may also be preferred, under the same or other circumstances. Additionally, the mentioning of one or more preferred embodiments does not mean that other embodiments are not useful, and it is not intended to exclude other embodiments from the scope of the present disclosure.

Hereinafter, a silicon oxide composite for a lithium secondary battery anode material of the present disclosure will be described in detail.

The present disclosure provides a silicon oxide composite for a lithium secondary battery anode material, which includes a Si cluster; and magnesium silicate, which is indicated as $Mg_xSiO_y$ (0.5≤x≤2, 2.5≤y≤4), formed on a peripheral portion of the Si cluster.

Figure 1:
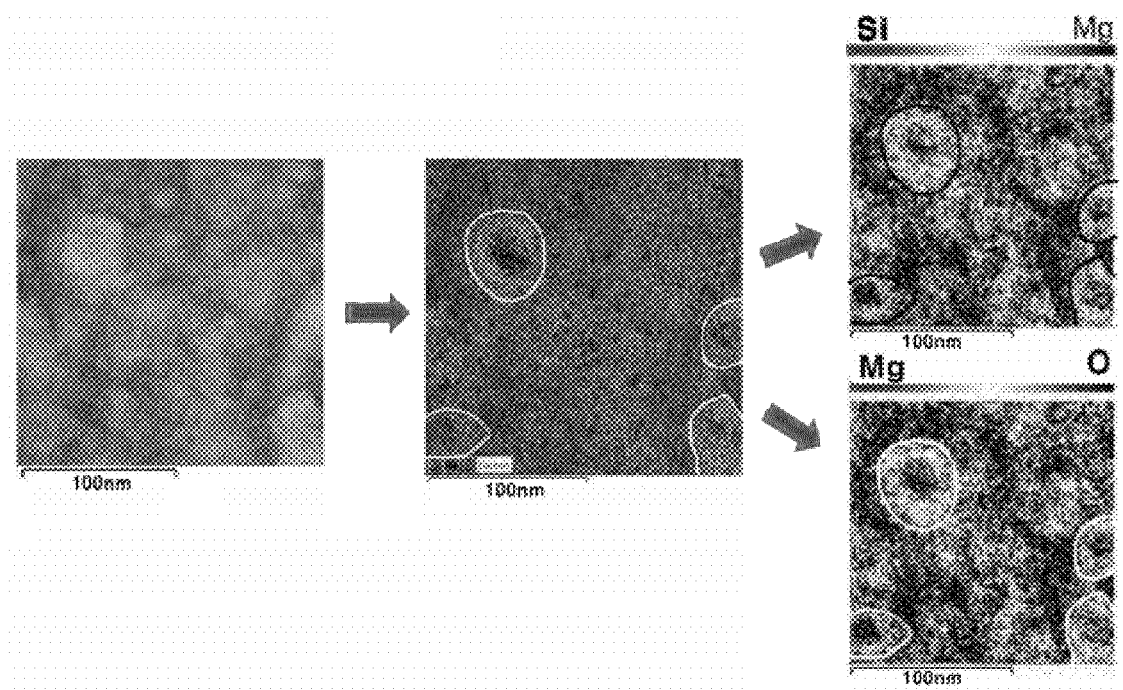
FIG. 1 shows the results of TEM-EDX analysis of cut specimen of a silicon oxide composite for a lithium secondary battery anode material prepared in an Example of the present disclosure.

A cross-section of a silicon oxide composite for a lithium secondary battery anode material according to the present disclosure is shown in FIG. 1. As shown in FIG. 1, it can be seen that the silicon oxide composite for a lithium secondary battery anode material according to the present disclosure includes a cluster, in which the concentration of Si is non-uniformly aggregated inside the particles, and includes $Mg_xSiO_y$ (0.5≤x≤2, 2.5≤y≤4) (i.e., magnesium silicate) in the peripheral portion of the Si cluster.

With regard to the silicon oxide composite for a lithium secondary battery anode material of the present disclosure, the $Si/SiO_x/SiO_2$ raw material powder mixture and metallic magnesium are evaporated to react in a gaseous state. Therefore, when raw materials are dissolved at a high temperature and evaporated under reduced pressure in a solid solution state, and react in a gaseous state and are cooled, an interface can be formed between the Si cluster and $Mg_xSiO_y$ (0.5≤x≤2, 2.5≤y≤4) on the periphery as a phase separation between the products proceeds.

Therefore, the silicon oxide composite for a lithium secondary battery anode material of the present disclosure can include a Si cluster and $Mg_xSiO_y$ (0.5≤x≤2, 2.5≤y≤4), which is magnesium silicate formed on the peripheral portion of the Si cluster, which cannot be formed at all by the conventional technology where magnesium is doped after a silicon composite is formed.

In the silicon oxide composite for a lithium secondary battery anode material of the present disclosure, the Si cluster and $Mg_xSiO_y$ (0.5≤x≤2, 2.5≤y≤4), which is formed on the peripheral portion of the Si cluster, can form a core shell structure.

Additionally, in the silicon oxide composite for a lithium secondary battery anode material of the present disclosure, the domain size of Si (220) in the Si cluster may be 12 nm or less.

Additionally, with regard to the silicon oxide composite for a lithium secondary battery anode material of the present disclosure, in X-ray diffraction pattern analysis, a peak belonging to a Si crystal may appear in a range of a diffraction angle 28°<2θ<29°, and a peak belonging to a MgSiO$_3$ crystal may appear in a range of a diffraction angle 30.5°<2θ<31.5°.

With regard to the silicon oxide composite for a lithium secondary battery anode material of the present disclosure, in X-ray diffraction pattern analysis, a full width at half maximum (FWHM) of Si (111) by the Si cluster may be in a range of 0.7 (deg) to 1.5 (deg).

The silicon oxide composite for a lithium secondary battery anode material of the present disclosure may include a Mg$_2$SiO$_4$ (foresterite) crystal, and the content of the Mg$_2$SiO$_4$ (foresterite) crystal may be smaller than that of a MgSiO$_3$ (enstatite) crystal. With regard to the silicon oxide composite for a lithium secondary battery anode material of the present disclosure, the peak intensity ratio between the Mg$_2$SiO$_4$ (foresterite) crystal phase and the MgSiO$_3$ (enstatite) crystal phase (i.e., $I_{Mg2SiO4}/I_{MgSiO3}$) may be in a range of 0 to 0.5 or less.

The silicon oxide composite for a lithium secondary battery anode material of the present disclosure may include Mg in a ratio of 2 to 15 parts by weight, and preferably 2 to 10 parts by weight relative to 100 parts by weight of the total.

The silicon oxide composite for a lithium secondary battery anode material of the present disclosure may include a carbon film on a surface thereof.

In the silicon oxide composite for a lithium secondary battery anode material of the present disclosure, an average thickness of the carbon film may be in a range of 5 nm to 100 nm.

Hereinafter, a method of manufacturing a silicon oxide composite for a lithium secondary battery anode material of the present disclosure will be described in detail.

The present disclosure provides a method of manufacturing a silicon oxide composite for a secondary battery anode material according to the present disclosure, which includes:

mixing silicon powder, silicon oxide (SiO$_x$, 0.9<x<1.1) powder, and silicon dioxide powder to prepare a Si/SiO$_x$/SiO$_2$ raw material powder mixture;

evaporating the Si/SiO$_x$/SiO$_2$ raw material powder mixture and metallic magnesium, respectively, reacting them, and then depositing the resultant to form an oxide composite;

cooling the formed silicon oxide composite; and milling the cooled silicon oxide composite.

The method of manufacturing a silicon oxide composite for a secondary battery anode material of the present disclosure may further include a step of cladding a surface of the milled silicon oxide composite with carbon.

With regard to the method of manufacturing a silicon oxide composite for a secondary battery anode material of the present disclosure, in the step of mixing the silicon powder, silicon oxide (SiO$_x$, 0.9<x<1.1) powder, and silicon dioxide powder to prepare a Si/SiO$_x$/SiO$_2$ raw material powder mixture, the powder mixture may be mixed by a drying method and stirred.

With regard to the method of manufacturing a silicon oxide composite for a secondary battery anode material of the present disclosure, in the step of mixing the silicon powder, silicon oxide (SiO$_x$, 0.9<x<1.1) powder, and silicon dioxide powder to prepare a Si/SiO$_x$/SiO$_2$ raw material powder mixture, the molar ratio of O/Si in the Si/SiO$_x$/SiO$_2$ raw material powder mixture may be in a range of 0.9 to 1.1.

When the molar ratio of O/Si in the Si/SiO$_x$/SiO$_2$ raw material powder mixture is 0.9 or less or 1.1 or above, the yield of the silicon oxide composite may be significantly low.

Additionally, the surface of the silicon powder may be oxidized. In the process of manufacturing the silicon powder, the surface may be oxidized by oxygen in the air. The oxygen content of the silicon powder is not limited. When the oxygen content is 50 wt % or less relative to the entire silicon powder, the O/Si molar ratio can be well adjusted, and when it is 30 wt % or less, the O/Si molar ratio can be better adjusted.

In the method of manufacturing a silicon oxide composite for a secondary battery anode material of the present disclosure, the Si/SiO$_x$/SiO$_2$ raw material powder mixture may include the oxidized silicon powder in an amount of 30 wt % or more, preferably 50 wt % or more, and more preferably 70 wt % or more, relative to the total amount of the raw material mixture.

In the method of manufacturing a silicon oxide composite for a secondary battery anode material of the present disclosure, it is possible to control the reaction rate and manufacture a product of uniform quality even when the raw materials are dry-mixed in a powder state by including SiO$_x$ as a raw material. When the content of the silicon oxide powder is 30 wt % or less, it is difficult to control the evaporation rate of silicon oxide according to the reaction time at the time of evaporating the raw material powder mixture under heating/reduced pressure to react with magnesium vapor, and thus, it is difficult to obtain uniform quality and the yield of the reaction product may be low. Additionally, there is a disadvantage in that a higher evaporation temperature is required to increase the evaporation rate of the raw material powder mixture.

Additionally, the average particle diameter and the specific surface area of the silicon powder, silicon oxide (SiO$_x$, 0<x<1.1) powder, and silicon dioxide powder to be included as raw materials may be in a range of 10 nm to 100 μm and 5 m$^2$/g to 500 m$^2$/g, respectively.

With regard to the method of manufacturing a silicon oxide composite for a secondary battery anode material of the present disclosure, after the step of mixing the silicon powder, silicon oxide (SiO$_x$, 0<x<1.1) powder, and silicon dioxide powder to prepare a Si/SiO$_x$/SiO$_2$ raw material powder mixture, the method may further include a step of subjecting the Si/SiO$_x$/SiO$_2$ raw material powder mixture to heat treatment. With regard to the method of manufacturing a silicon oxide composite for a secondary battery anode material of the present disclosure, in the step of subjecting the Si/SiO$_x$/SiO$_2$ raw material powder mixture to heat treatment, the raw material powder mixture may be subjected to heat treatment at 800° C. to 1,100° C. at normal pressure for 1 to 3 hours to increase the composition uniformity of the raw material powder mixture.

The heat treatment is preferably performed in an inert gas (e.g., argon, nitrogen, helium, etc.) or reducing gas (e.g., hydrogen) atmosphere. In an oxidizing gas atmosphere, the silicon powder and the silicon oxide powder may be oxidized, thereby reducing the yield.

With regard to the method of manufacturing a silicon oxide composite for a secondary battery anode material of the present disclosure, in the step of evaporating the Si/SiO$_x$/SiO$_2$ raw material powder mixture and metallic magnesium, respectively, reacting them, and then depositing the resultant to form an oxide composite, the Si/SiO$_x$/SiO$_2$ raw material powder mixture and the metallic magnesium may be evaporated in separate reactors, respectively, and reacted in a gaseous state. The method of manufacturing a silicon oxide composite for a secondary battery anode material of the present disclosure may be performed such that the $Si/SiO_x/SiO_2$ raw material powder mixture and the metallic magnesium are evaporated in separate reactors by heating, and then reacted in a gaseous state, whereby the silicon oxide composite for a secondary battery anode material may be formed in a structure which includes a Si cluster; and magnesium silicate, which is indicated as $Mg_xSiO_y$ ($0.5 \leq x \leq 2$, $2.5 \leq y \leq 4$), formed on a peripheral portion of the Si cluster.

With regard to the method of manufacturing a silicon oxide composite for a secondary battery anode material of the present disclosure, the evaporation of $Si/SiO_x/SiO_2$ raw material powder mixture and metallic magnesium may be performed at 800° C. to 1,600° C. under normal pressure under a pressure of 0.001 torr to 2 torr.

With regard to the method of manufacturing a silicon oxide composite for a secondary battery anode material of the present disclosure, in the step of evaporating and depositing the $Si/SiO_x/SiO_2$ raw material powder mixture and metallic magnesium to form an oxide composite, the $Si/SiO_x/SiO_2$ raw material powder mixture may be performed at 1,000° C. to 1,600° C. under normal pressure under a pressure of 0.001 torr to 2 torr.

With regard to the method of manufacturing a silicon oxide composite for a secondary battery anode material of the present disclosure, in the step of evaporating and depositing the $Si/SiO_x/SiO_2$ raw material powder mixture and metallic magnesium to form an oxide composite, the metallic magnesium may be performed at 800° C. to 1,000° C. under normal pressure under a pressure of 0.001 torr to 2 torr.

With regard to the method of manufacturing a silicon oxide composite for a secondary battery anode material of the present disclosure, in the step of cladding the surface with carbon, the silicon oxide composite may be reacted with one or more carbon precursors selected from the group consisting of methane, propane, butane, acetylene, benzene, and toluene at 600° C. to 1,200° C. in a gaseous state.

The present disclosure also provides an anode for a lithium secondary battery provided with a silicon oxide composite for a secondary battery anode material.

The present disclosure also provides a lithium secondary battery, which includes the anode for a lithium secondary battery provided with a silicon oxide composite for a secondary battery anode material according to the present disclosure.

In the lithium secondary battery of the present disclosure which includes the anode for a lithium secondary battery provided with a silicon oxide composite for a secondary battery anode material, when the battery is charged twice, the peak in the vicinity of 0.45 V in the dQ/dV curve may appear to be greater than that at 0.25 V.

In the lithium secondary battery which includes the anode for a lithium secondary battery, after the battery is discharged twice, the XRD peak derived from $Mg_xSiO_y$ may not appear.

Hereinafter, the present disclosure will be described in detail by embodiments, but the present disclosure is not limited by these embodiments.

EXAMPLES

<Example 1> Preparation of Silicon Oxide Composite-Carbon Complex Powder $Mg_8$—$SiO_x$/C 20 kg of silicon powder with an average particle size of 20 μm, 50 kg of silicon dioxide powder with an average particle size of 20 nm, and 130 kg of silicon oxide ($SiO_x$, x=1.03) powder with an average particle size of 200 μm were uniformly mixed by stirring with a Henschel mixer for 2 hours to form a raw material powder mixture. The raw material powder mixture was heat-treated at 1,000° C. at normal pressure under argon atmosphere for 2 hours.

The heat-treated raw material powder mixture and metallic magnesium in an amount of 16 kg were each added into furnace-A and furnace-B of a vacuum reactor, and the pressure was reduced to reach 0.1 torr, and heated. Then, the furnace-A including the raw material powder mixture was heated to 1,450° C. and the raw material powder mixture was evaporated, and metallic magnesium in the furnace-B was evaporated by raising the temperature to 850° C., and then reacted in a vapor state for 5 hours. A silicon oxide composite mass deposited on the substrate inside the reactor by reacting in a high-temperature gas phase was rapidly cooled to room temperature by a water-cooled substrate.

The silicon oxide composite mass was pulverized by a mechanical method to control the particle size so that the average particle size was 6 μm.

The pulverized silicon oxide composite powder (50 g) was added into a tube-type electric furnace and maintained it at 1,000° C. for 1 hour while flowing Ar gas and methane gas at 1 L/min each, to thereby prepare a silicon oxide composite-carbon complex powder $Mg_8$-$SiO_x$/C, whose surface was coated with carbon.

As a result of ICP-MS analysis to measure the content of Mg in the silicon oxide composite-carbon complex powder prepared in Example 1, the content of Mg was measured to be 8 wt %.

<Example 2> Preparation of Silicon Oxide Composite-Carbon Complex Powder $Mg_6$—$SiO_x$/C A silicon oxide composite-carbon complex powder $Mg_6$—$SiO_x$/C was prepared in the same manner as in Example 1 except that 12 kg of the metallic magnesium of Example 1 was added.

As a result of ICP-MS analysis to measure the content of Mg in the silicon oxide composite-carbon complex powder prepared in Example 2, the content of Mg was measured to be 6 wt %.

<Example 3> Preparation of Silicon Oxide Composite-Carbon Complex Powder $Mg_3$—$SiO_x$/C A silicon oxide composite-carbon complex powder $Mg_3$—$SiO_x$/C was prepared in the same manner as in Example 1 except that 6 kg of the metallic magnesium of Example 1 was added.

As a result of ICP-MS analysis to measure the content of Mg in the silicon oxide composite-carbon complex powder prepared in Example 3, the content of Mg was measured to be 3 wt %.

<Example 4> Preparation of Silicon Oxide Composite-Carbon Complex Powder $Mg_{12}$—SiO/C A silicon oxide composite-carbon complex powder $Mg_{12}$—$SiO_x$/C was prepared in the same manner as in Example 1 except that 24 kg of the metallic magnesium of Example 1 was added.

As a result of ICP-MS analysis to measure the content of Mg in the silicon oxide composite-carbon complex powder prepared in Example 4, the content of Mg was measured to be 12 wt %.

<Comparative Example 1> Preparation of Silicon Oxide Composite-Carbon Complex Powder 20 kg of silicon powder with an average particle size of 20 μm and 50 kg of silicon dioxide powder with an average particle size of 20 nm were added into water, uniformly mixed by stirring for 12 hours, and dried at 1,200° C. (or 200° C.: temperature confirmation required) to form a raw material powder mixture.

The raw material powder mixture and metallic magnesium in an amount of 11 kg were each added into furnace-A and furnace-B of a vacuum reactor, and the pressure was reduced to reach 0.1 torr, and heated. Then, the furnace-A including the raw material powder mixture was heated to 1,600° C. and the raw material powder mixture was evaporated, and metallic magnesium in the furnace-B including was evaporated by raising the temperature to 900° C., and the vapor in the furnace-A and the vapor in the furnace-B were reacted for 3 hours. Then, silicon oxide composite-carbon complex powder of Comparative Example 1 was prepared by the process of the cooling, milling, and carbon cladding process as in Example 1.

As a result of ICP-MS analysis to measure the content of Mg in the silicon oxide composite-carbon complex powder prepared in Comparative Example 1, the content of Mg was measured to be 13 wt %.

<Comparative Example 2> Preparation of Silicon Oxide Composite-Carbon Complex Powder A silicon oxide composite-carbon complex powder of Comparative Example 2 was prepared in the same manner as in Comparative Example 1 except that 13 kg of the metallic magnesium of Comparative Example 1 was added.

As a result of ICP-MS analysis to measure the content of Mg in the silicon oxide composite-carbon complex powder prepared in Comparative Example 2, the content of Mg was measured to be 16 wt %.

<Comparative Example 3> Preparation of Silicon Oxide-Carbon Complex Powder $SiO_x/C$ 20 kg of silicon powder with an average particle size of 20 μm and 50 kg of silicon dioxide powder with an average particle size of 20 nm were added into water, uniformly mixed by stirring for 12 hours, and dried at 1,200° C. (or 200° C.: temperature confirmation required) to form a raw material powder mixture.

The raw material powder mixture was added into furnace-A and furnace-B, and the pressure was reduced to reach 0.1 torr, and heated. Then, the furnace-A including the raw material powder mixture was heated to 1,600° C. and deposited on a cooling plate for 3 hours. Then, the silicon oxide-carbon complex powder of Comparative Example 3 (i.e., $SiO_x/C$), in which magnesium was not added, was prepared by the process of the cooling, milling, and carbon cladding process as in Example 1.

<Experimental Example> Measurement of TEM-EDX

With regard to the silicon oxide composite-carbon complex powder Mgs-$SiO_x$/C sample for measurement prepared in Example 1 above, a processed surface (cross-section) was prepared through FIB processing by using FIB from the surface (a porous layer surface) of the sample for measurement to a depth direction (a direction toward the inside of the sample for measurement).

The obtained processed surface was subjected to TEM-EDX measurement (a reflected electron image) at an acceleration voltage of 2.1 kV and a magnification of 6,500, and the results are shown in FIG. 1.

As shown in FIG. 1, it was possible to confirm that the silicon oxide composite-carbon complex powder Mgs-$SiO_x$/C prepared in Example 1 includes a Si cluster; and magnesium silicate indicated by $Mg_xSiO_y$ (0.5≤x≤2, 2.5≤y≤4) formed on the peripheral portion of the Si cluster.

When the materials prepared in Examples 2 to 4 were subjected to TEM-EDX measurement in the same manner, it was confirmed that the measurement of the silicon oxide composite-carbon complex powder prepared in Examples 2 to 4 also included a Si cluster; and magnesium silicate formed on the peripheral portion of the Si cluster.

<Experimental Example> XRD Measurement

XRD data was measured for the materials prepared in Examples 1 to 4 and Comparative Examples 1 to 3 above. The results are shown in FIGS. 2 to 8, and the intensity at each peak was measured and shown in Table 1 below.

TABLE 1

|  | Example | | | | Comparative Example | | |
| --- | --- | --- | --- | --- | --- | --- | --- |
|  | 1 | 2 | 3 | 4 | 1 | 2 | 3 |
| Mg Content | 8 | 6 | 3 | 12 | 13 | 16 | 0 |
| Si (111) 2θ (°) | 28.38 | 28.70 | 28.52 | 28.45 | 28.47 | 28.56 | 28.53 |
| Si (111) FWHM | 0.95 | 0.98 | 0.84 | 0.94 | 0.54 | 0.58 | 1.89 |
| $I_{MgSiO3(610)}/I_{Si(111)}$ | 0.14 | 0.21 | 0.26 | 0.20 | 0.11 | 0.19 | — |
| $I_{Mg2SiO4}/I_{MgSiO3}$ | 0 | 0 | 0 | 280.84/766.96 = 0.366 | 0.016/0.007 = 2.29 | 122.94/153.58 = 0.8 |  |
| Si c.s. Domain Size | 8.6 | 8.4 | 9.8 | 8.7 | 15.2 | 14.1 | 6 |

Figure 8:
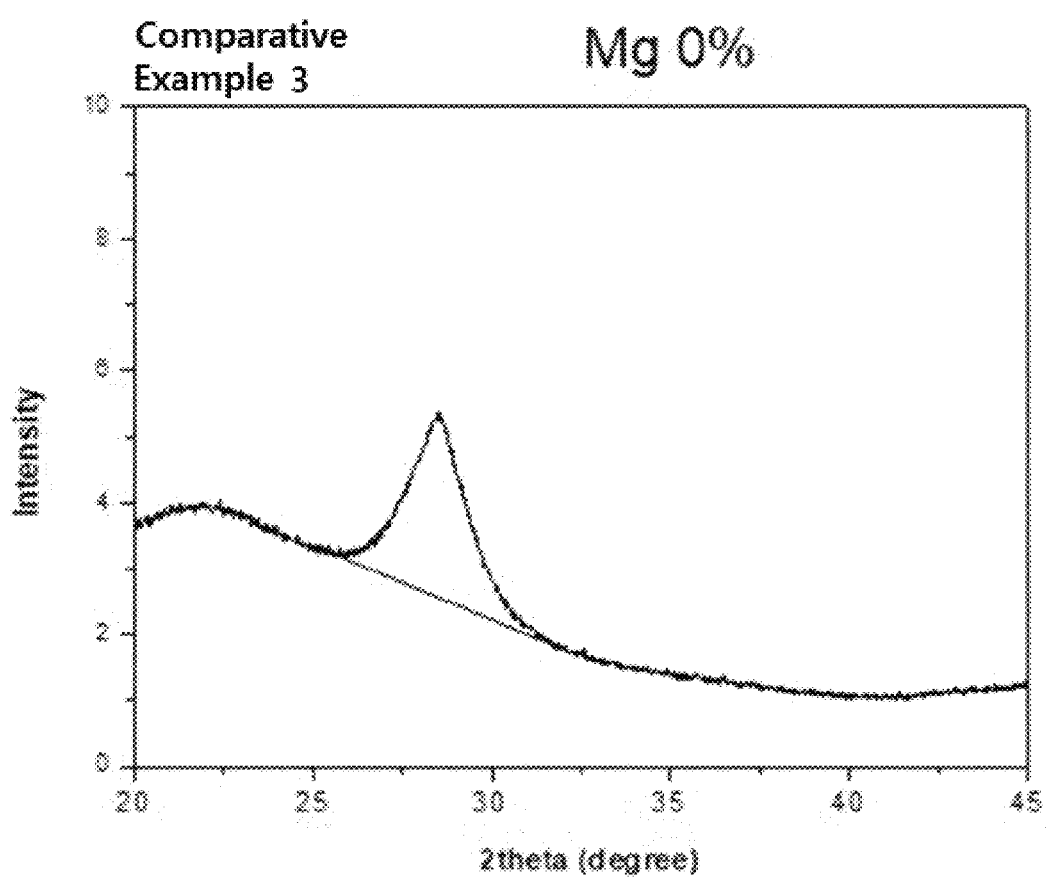

In FIG. 8, which shows the XRD measurement results for Comparative Example 3 material not doped with magnesium, it was confirmed that a peak by non-crystalline silicon oxide (a-$SiO_2$) appeared in a range of 20° to 40°, and the peak by crystalline silicon oxide appeared with the highest intensity at 280 and 45°.

Figure 2:
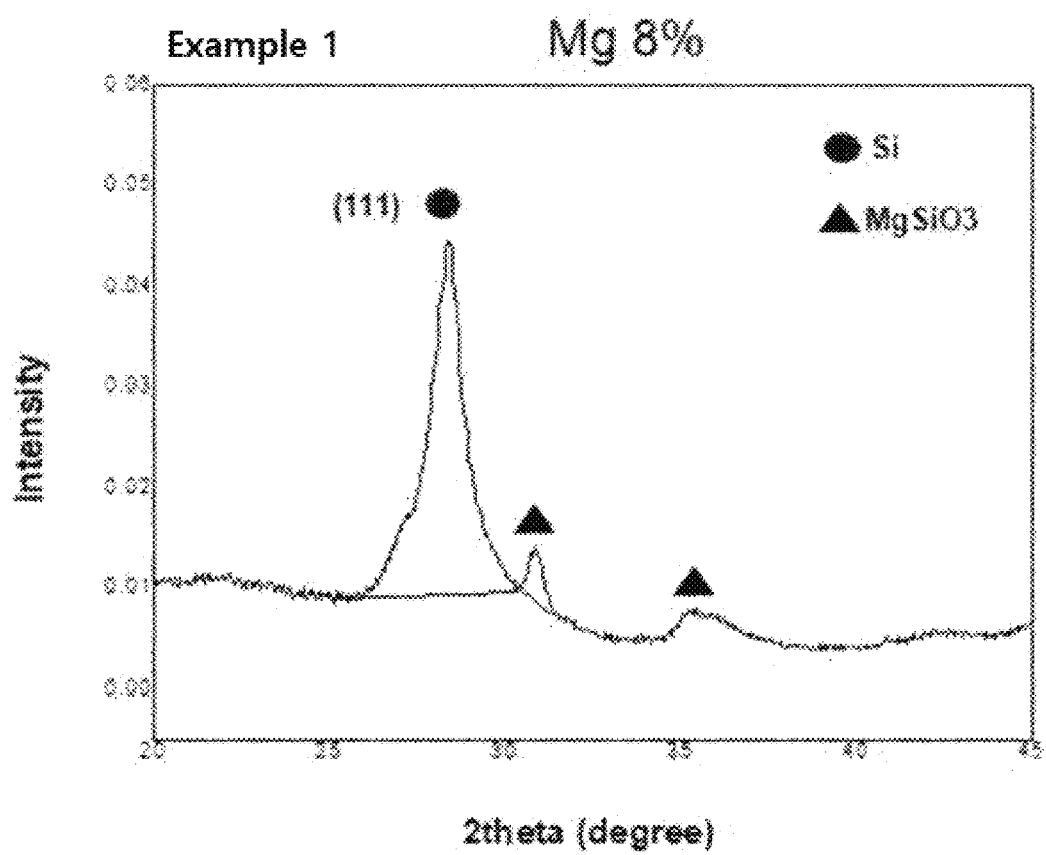
FIGS. 2 to 8 show the results of XRD analysis of the silicon oxide composites for a lithium secondary battery anode material prepared in Examples and Comparative Examples of the present disclosure.
Figure 3:
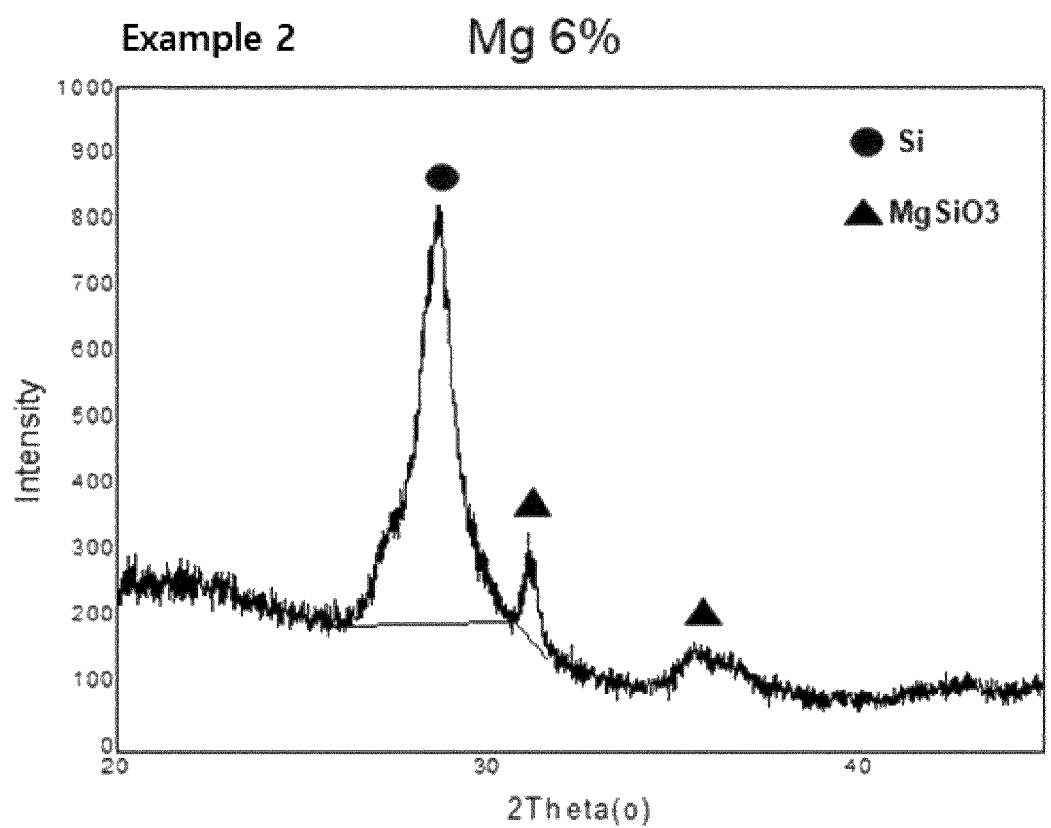
Figure 4:
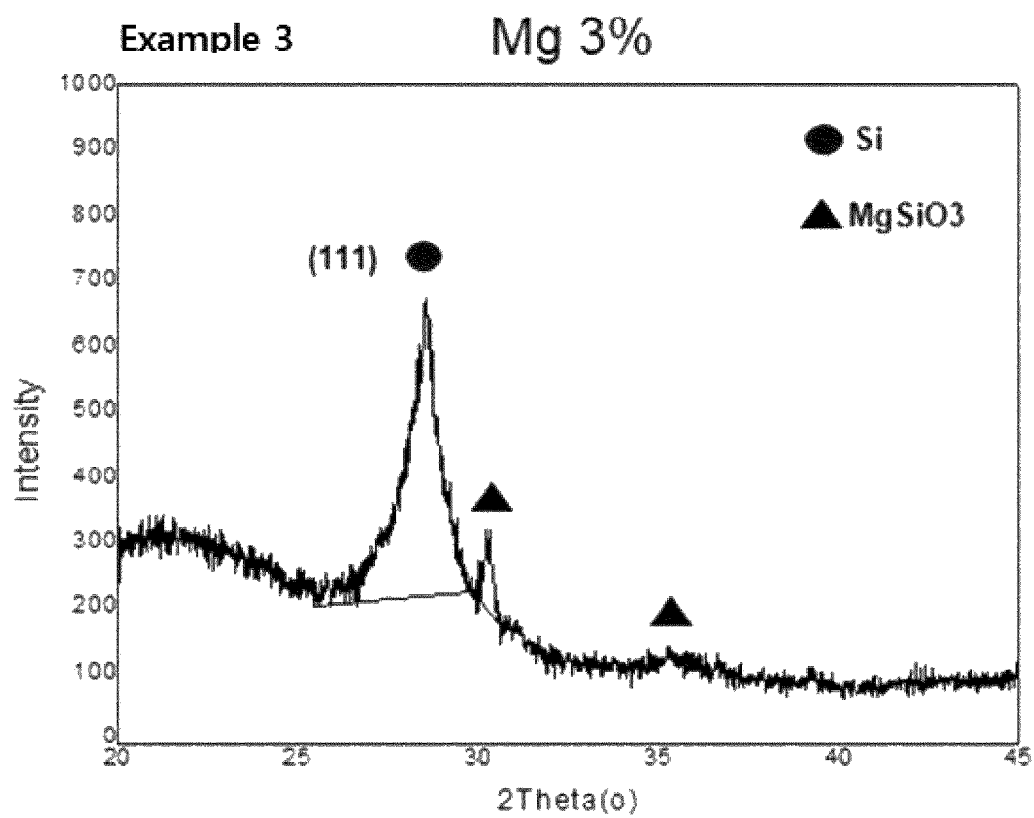
Figure 5:
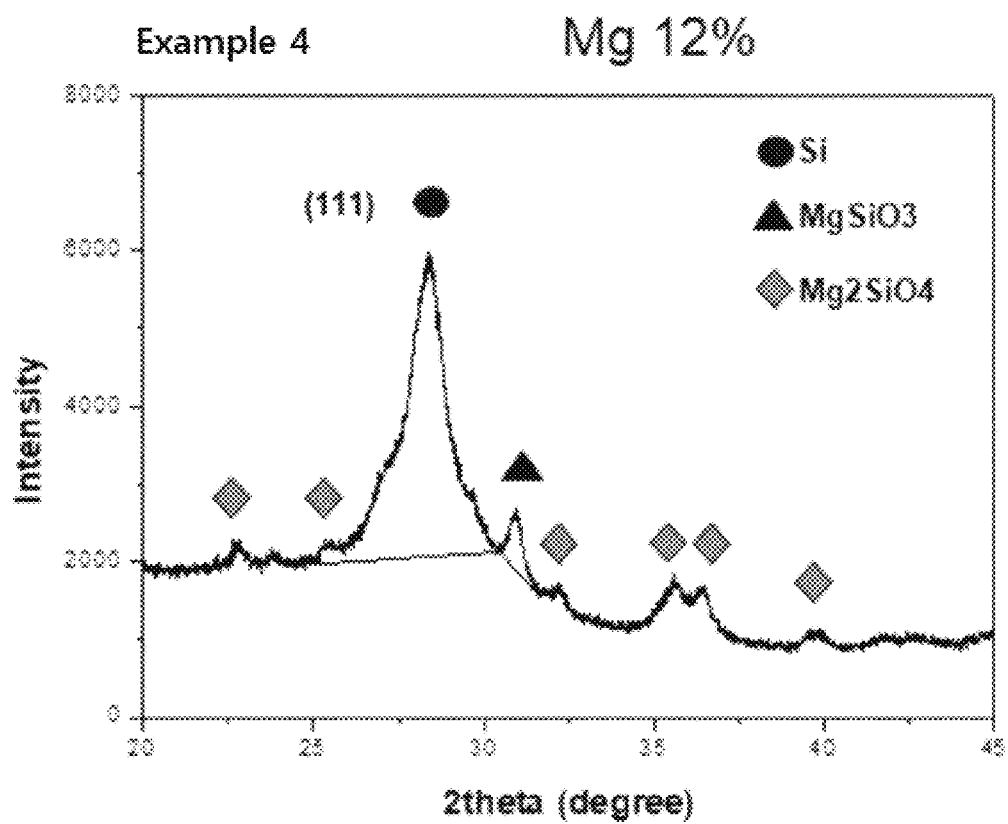
Figure 6:
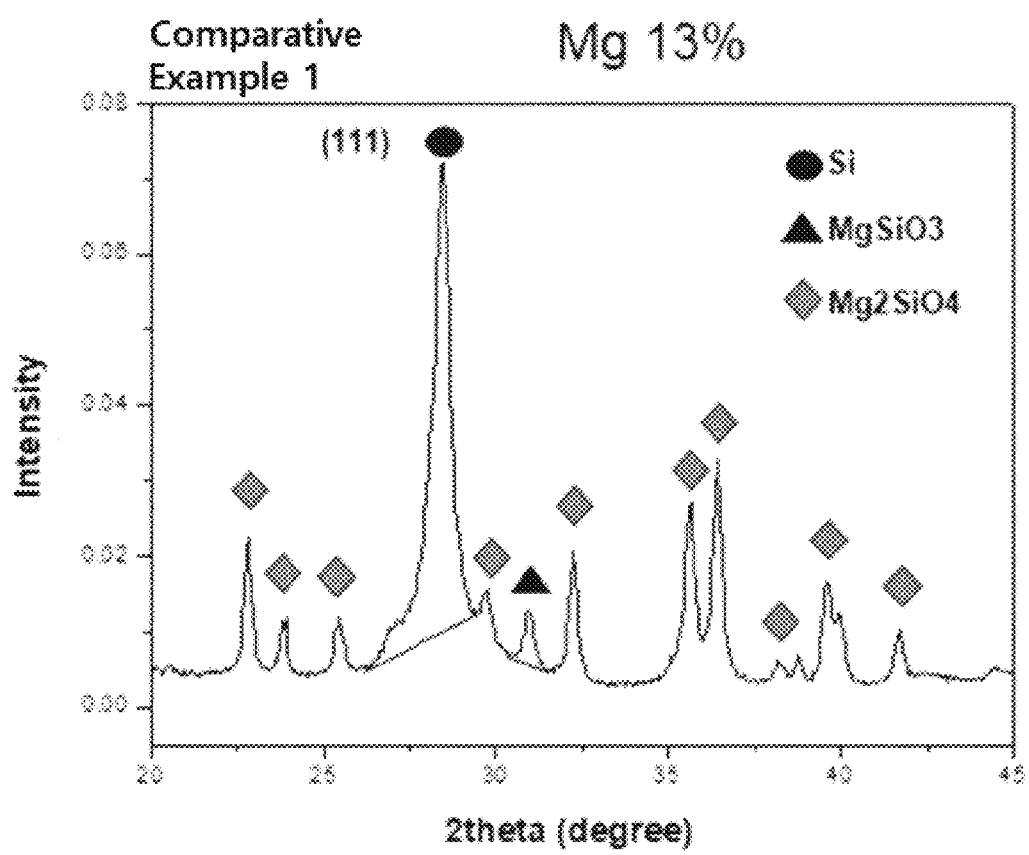
Figure 7:
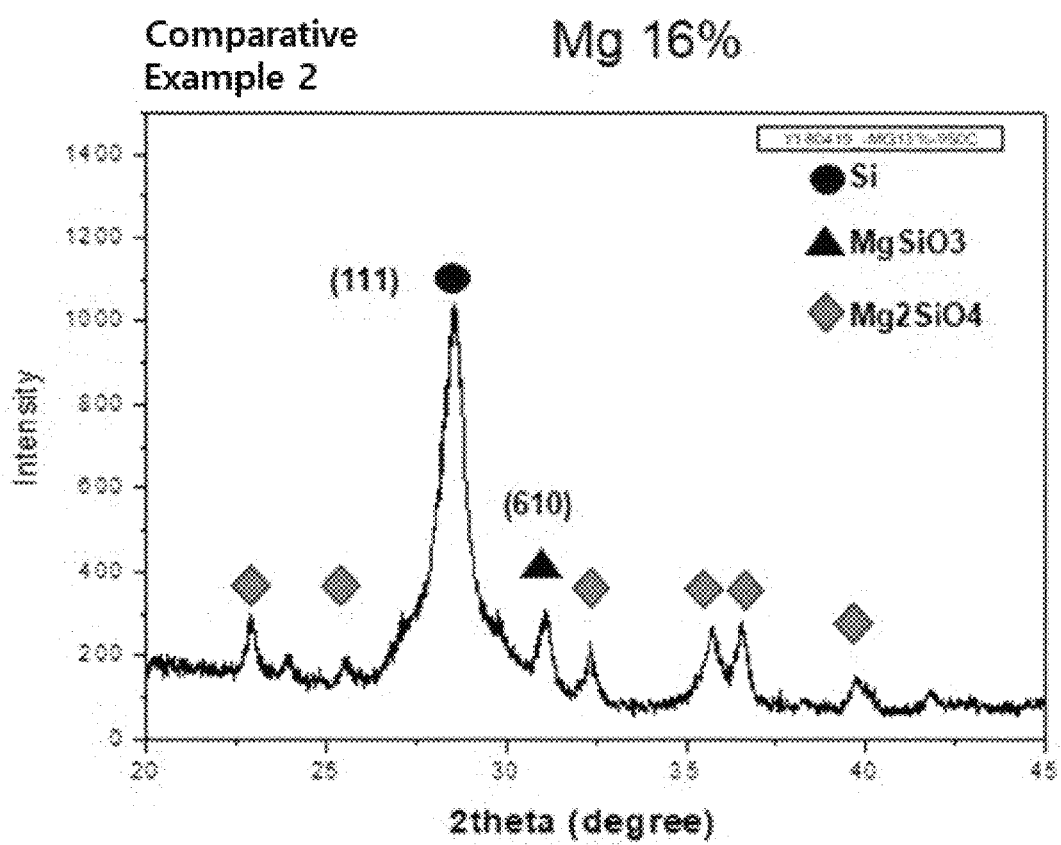

As shown in FIG. 2, it was observed that while only the peak due to the MgSiO$_3$ crystal phase appeared in the case of Example 1, a peak due to the forsterite crystal phase of Mg$_2$SiO$_4$ appeared in the cases of Comparative Examples 1 and 2. Accordingly, it was confirmed that in the case of Examples that the peak intensity of the forsterite crystal phase of Mg$_2$SiO$_4$ at 32.5° and the peak intensity ratio $I_{Mg2SiO4}/I_{MgSiO3}$ of the MgSiO$_3$ crystal phase were 0.5 or less.

<Experimental Example> Measurement of Domain Size

From the results of XRD measurement, the Si crystal size in the silicon oxide composite can be measured as follows.

Based on the full width at half maximum (FWHM) of the peak belonging to Si (111) in the X-ray diffraction pattern, the domain size was measured by the Sherrer equation expressed by the following General Formula 1(1), and the results are shown in Table 1 above.

$$C.S. [nm] = K \sim \lambda/B \cdot \cos \theta \quad \text{General Formula 1}$$

In General Formula 1, K=0.9, λ=0.154 nm, B=FWHM (rad),
and θ=peak position (angle).

From Table 1 above, it was confirmed that the domain size of the crystalline silicon particles Si (220) increased in proportion to the content of Mg in the particles.

<Experimental Example> XPS Measurement

Figure 9:
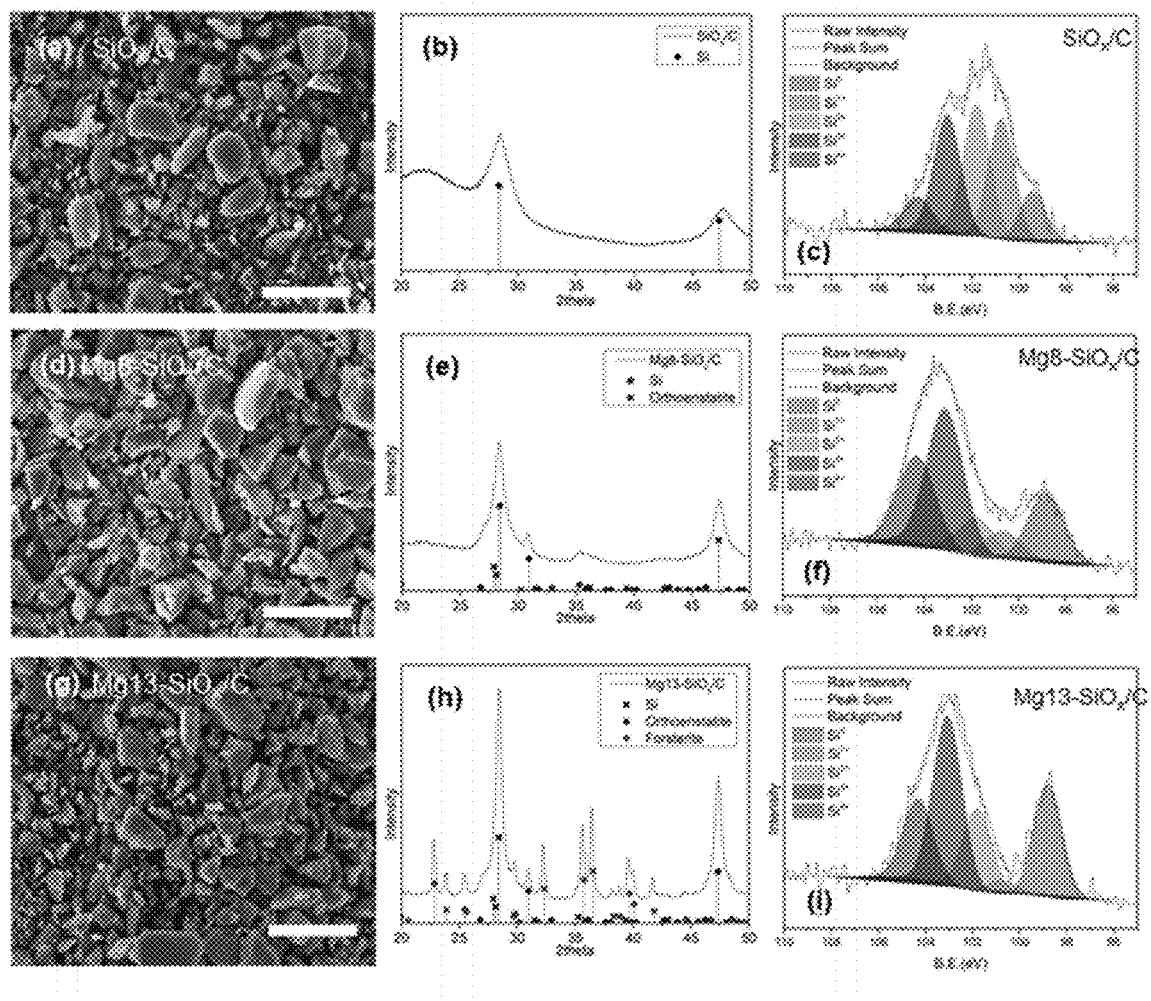
FIG. 9 shows the results of XPS analysis for the silicon oxide composites for a lithium secondary battery anode material prepared in Examples and Comparative Examples of the present disclosure.

XPS of the particles prepared in Example and Comparative Example 3 was measured, and the results are shown in FIG. 9.

As shown in FIG. 9, it was confirmed that according to Example of the present disclosure, when the Mg content in the particles was 8 wt %, the peak by Mg$_2$SiO$_4$ did not appear but the peak by MgSiO$_3$ appeared; however, according to Comparative Example of the present disclosure, when the Mg content in the particles was 13 wt %, the peak by Mg$_2$SiO$_4$ appeared.

Additionally, as shown in FIG. 9, it was confirmed that as the content of Mg in the particles increased, the peak intensity of Si0 (corresponding to a binding energy of 98 eV to 99 eV) and Si$^{3+}$ (corresponding to Mg$_x$SiO$_y$) increased.

This confirms that as the Mg content in the particles increases, the reaction from SiO$_x$ to Si decreases, and Mg is converted into Mg$_x$SiO$_y$.

<Experimental Example> STEM-EDX Measurement

Figure 15:
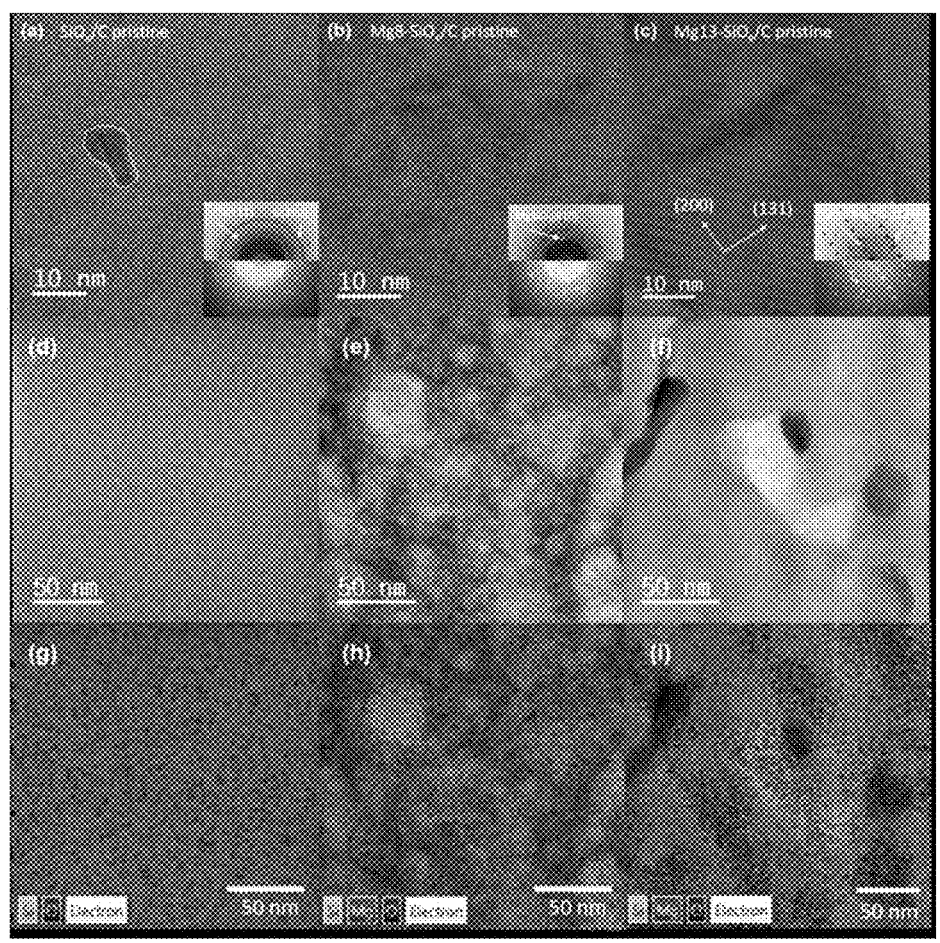
FIG. 15 shows the STEM measurement results of a silicon oxide composite for a lithium secondary battery anode material prepared in an Example and a Comparative Example of the present disclosure.

STEM-EDX of the particles prepared in Example was measured and the results are shown in FIG. 15. In FIG. 15, it can be seen that the shape of the silicon oxide composite prepared is cladded with a carbon layer of several tens of nm having a shape such as carbon nanofibers and graphene on the surface. In addition, it was confirmed in FIG. 15 that magnesium was uniformly distributed inside the silicon oxide composite powder prepared by the present disclosure.

<Preparation Example> Manufacture of Lithium Secondary Battery to which Silicon Oxide Composite is Applied The silicon oxide composite powder prepared according to Examples 1 and 2 and Comparative Example 3 and natural graphite were mixed in a weight ratio of 73:27 so as to prepare an anode and a battery (coin cell) for a lithium secondary battery as an electrode active material.

The mixed active material, binder carboxy methyl cellulose (CMC), and styrene butadiene rubber (SBR) in a weight ratio of 97:1.5:1.5 were mixed with water to prepare an anode slurry.

An electrode with a thickness of 70 μm was prepared by coating the composition on a copper foil with a thickness of 18 μm followed by drying. An anode for a coin cell was prepared by punching the electrode-coated copper foil in a circular form with a diameter of 14 mm. A metallic lithium foil with a thickness of 0.3 mm was used as an opposite electrode.

A porous polyethylene sheet with a thickness of 0.1 mm was used as a separator. The electrolyte was prepared by dissolving 1 M LiPF$_6$ in a solution where ethylene carbonate (EC) and diethylene carbonate (DEC) were mixed in a 1:1 volume ratio. A coin cell (battery) with a thickness of 2 mm and a diameter of 32 mm (so-called "2032 type") was prepared by applying the constitutional elements above.

<Experimental Example> Evaluation of Electrochemical Characteristics

Each of the coin cells, which were prepared per sample in Preparation Example above, were charged with a static current of 0.1 C until the voltage reached 0.005 V, and then the coin cells were discharged with a static current 0.1 C until the voltage reached 2.0 V, and thereby its charge capacity (mAh/g), discharge capacity (mAh/g), and initial charge/discharge efficiency (%) were obtained.

Additionally, each of the coin cells, which were prepared per sample in Preparation Example above, were charged and discharged once. Then, from the second cycle of charge and discharge, each coin cell was charged with a static current 0.5 C until the voltage reached 0.005 V and then discharged with a static current 0.1 C until the voltage reached 2.0 V, and thereby its cycle characteristics (capacity maintaining rate) were obtained.

The charge and discharge capacities, the initial charge/discharge efficiency, and the capacity maintaining rate are shown in Table 2 below.

TABLE 2

|  | Example | | | | Comparative Example | | |
| --- | --- | --- | --- | --- | --- | --- | --- |
|  | 1 | 2 | 3 | 4 | 1 | 2 | 3 |
| Initial Charge Capacity (mAh/g) | 1,382 | 1,460 | 1,556 | 1,257 | 1,224 | 1,143 | 1,647 |
| Initial Efficiency (%) | 82.1 | 79.8 | 78.1 | 85.2 | 85.9 | 87.4 | 74.7 |
| Capacity Maintaining Rate (0.2 C, @50 cycles, %) | 84.6 | 89.3 | 88.4 | 80.2 | 76.1 | 74.7 | 90.1 |

As shown in Table 2 above, the initial discharge capacity in Example 1 was 1,382 mAh/g which is lower than 1,647 mAh/g of Comparative Example 3, whereas the initial charge/discharge efficiency in Example 1 was higher than in Comparative Example 3, and the initial discharge capacity was lowest in Comparative Example 2.

Mg$_x$SiO$_y$ produced by a reaction of magnesium with silicon oxide is known to be electrochemically inert, and it is speculated that as the Mg content increases in Comparative Example 1 than in Example 1, the electrochemically inert $Mg_xSiO_y$ is produced in a larger quantity, thereby reducing the charge/discharge capacity.

Figure 12:
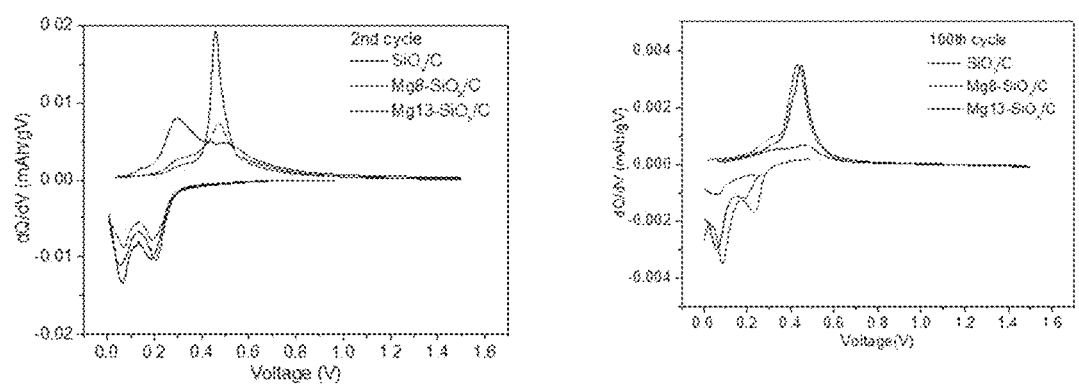

Although the voltage in the charging process in FIG. 12 was 0.1 V or less, it was confirmed that the overvoltage was formed to be high as the magnesium content increased.

The dQ/dV, when the charge/discharge process was performed two cycles and 100 cycles, was measured using the batteries prepared in Examples and Comparative Examples of the present disclosure, and the results are shown in FIG. 12.

Figure 11:
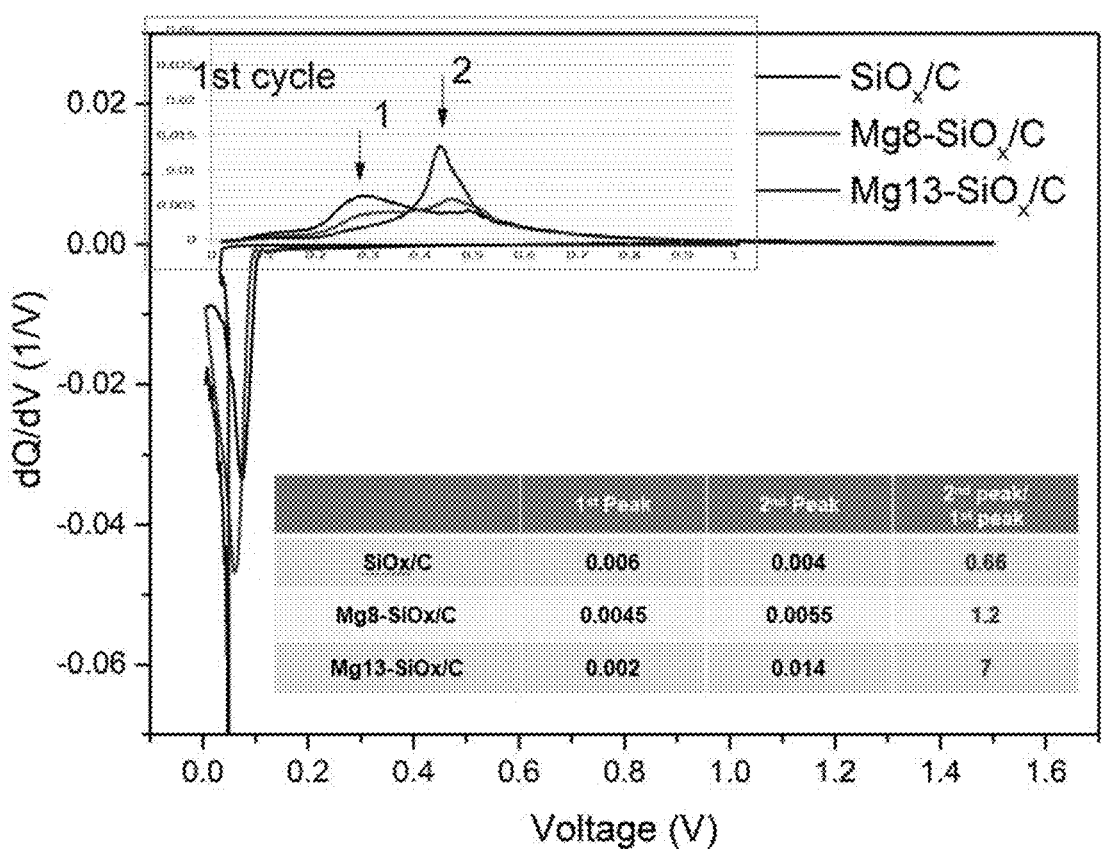
FIGS. 11 and 12 show the measurement results of the electrochemical properties of the battery including an anode material of an Example and Comparative Example 3 of the present disclosure.

As shown in FIG. 11, in the case of Examples of the present disclosure, it was confirmed that the peak at around 0.45 V was greater than the peak at 0.25 V in the dQ/dV curve when the battery was charged twice.

<Experimental Example> Measurement of Volume Change According to Charge/Discharge After performing 100 cycles of charge/discharge experiments on the battery prepared in Preparation Example, SEM analysis of the electrode and XRD analysis of the particles was performed, and the results are shown in Table 3 below.

TABLE 3

|  | Example 1 | Comparative Example 1 |
| --- | --- | --- |
| Pristine (μm) | 23 | 18 |
| After Cycle (μm) | 33 | 40 |
| Difference (μm) | 10 | 22 |
| Swelling Ratio (%) | 44 | 122 |

As shown in Table 3 above, while the thickness of the electrode before charge/discharge was 23 μm and it changed to 33 μm after 100 cycles of charge/discharge in Example 1, the thickness of the electrode was 18 μm before charge/discharge and it changed to 40 μm after 100 cycles of charge/discharge in Comparative Example 1. Therefore, it was confirmed that in the case of the silicon composite oxide of Example 1, the volume change was reduced compared to Comparative Example 1.

Figure 13:
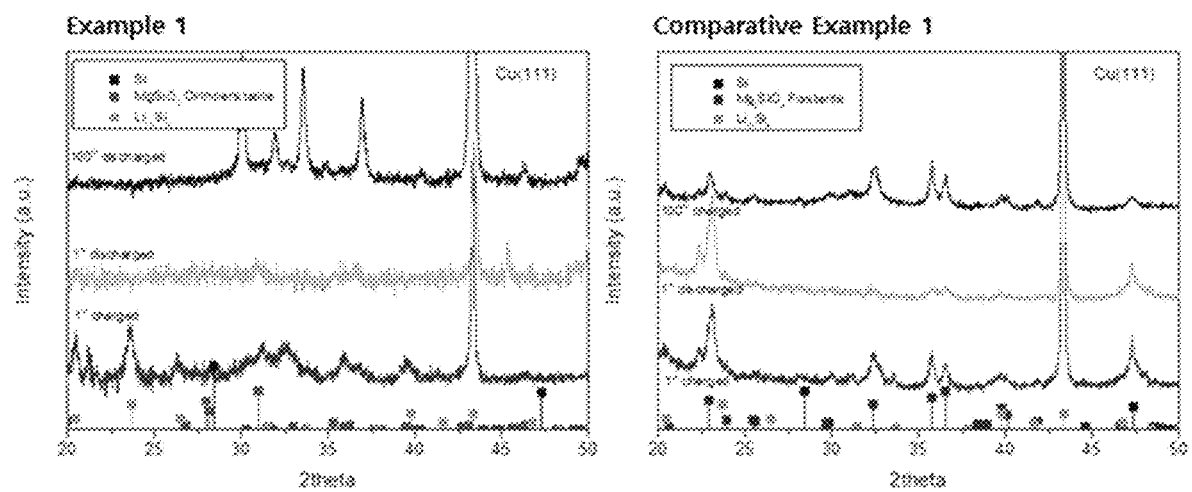
FIG. 13 shows Ex-Situ XRD measurement results of electrodes after charge/discharge of the batteries including an anode material of an Example and a Comparative Example of the present disclosure.

<Experimental Example> Ex Situ XRD Measurement Before and After Charge/Discharge Ex-situ XRD was measured for the batteries including the silicon composite particles of Example 1 and Comparative Example 1 after one cycle of charge/discharge and 100 cycles of charge/discharge, and the results are shown in FIG. 13.

As shown in FIG. 13, in the case of Example 1, no peak was observed except the peak shown by $MgSiO_3$ and copper used as the current collector after one cycle of charge/discharge, and lithium hydroxide or lithium oxide peaks were observed after 100 cycles of charge/discharge. In contrast, as shown in FIG. 13, in the case of Comparative Example 1, although no peak was observed except the peak shown by $Mg_2SiO_4$ after one cycle of charge/discharge as in Example 1, peaks similar to the initial particle appeared after 100 cycles of charge/discharge.

In FIG. 13, in the case of Examples of the present disclosure, it was confirmed that the XRD peak derived from $Mg_xSiO_y$ did not appear after two rounds of discharge.

Figure 14:
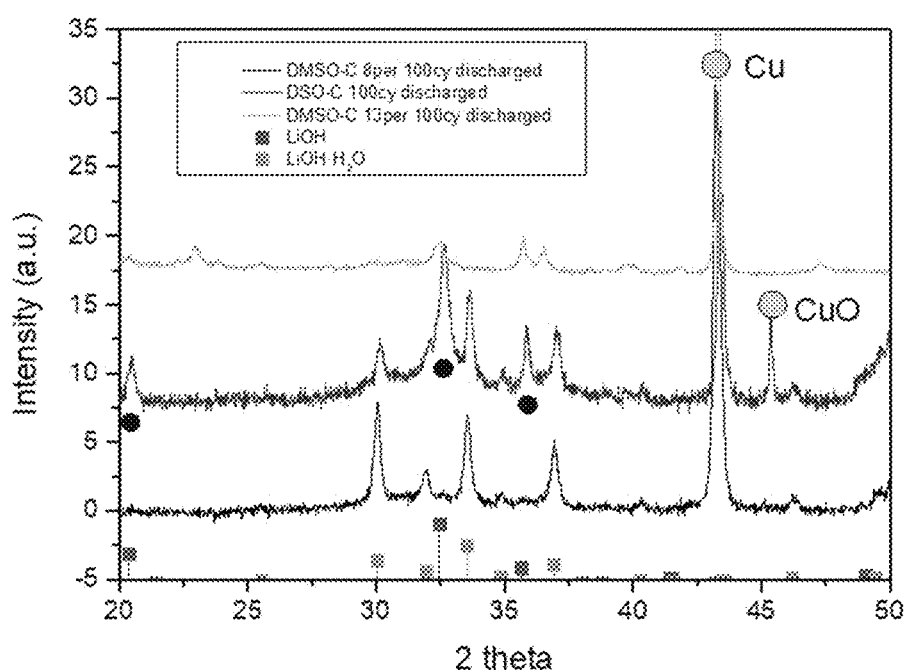
FIG. 14 shows the XRD measurement results after 100 cycles of a silicon oxide composite for a lithium secondary battery anode material prepared in an Example and a Comparative Example of the present disclosure.

The XRD results of Example 1, Comparative Example 1, and Comparative Example 3 after 100 cycles of charge/discharge are shown in FIG. 14. In FIG. 14, it was confirmed that LiOH was detected only in Comparative Example 3 and Example 1.

<Experimental Example> TEM, STEM-HAADF, and STEM-EDX Measurement

TEM, STEM-HAADF, and STEM-EDS were measured for the particles of Example 1, Example 2, and Comparative Example 3, and the results are shown in FIG. 15.

In FIG. 15, in the case of Comparative Example 3 in which Mg was not mixed, annular patterns corresponding to Si (111) and Si (220) were formed.

In the case of Example 1, unlike Comparative Example 3, the crystal structure was formed to be wider than Comparative Example 3, and $MgSiO_3$ spots appeared. In contrast, in the case of Comparative Example 1, the non-crystalline portion appeared to be narrower than Comparative Example 3 and Example 1, and most of it was observed to be crystalline, and it was confirmed that a grain boundary between Si and $Mg_2SiO_4$ clearly appeared, as shown in FIG. 15c.

As shown in FIGS. 15e and 15h, in the case of Example 1, $SiO_x$ was formed around Si as a core shell structure. In contrast, as shown in FIGS. 15f and 15i, in the case of Comparative Example 1, it could be seen that the crystal structures of Example 1 and Comparative Example 1 were completely different because the Si and $Mg_xSiO_y$ portions were clearly separated.

Figure 10:
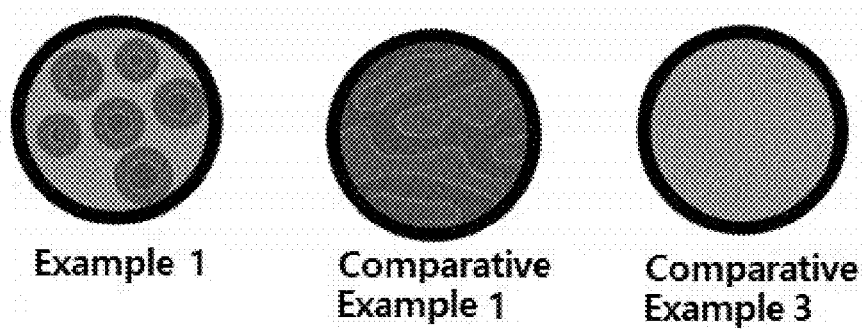
FIG. 10 shows schematic diagrams of components for a cross-section of a silicon oxide composite for a lithium secondary battery anode material prepared in an Example and a Comparative Example of the present disclosure.

Based on the analysis results above, FIG. 10 shows schematic diagrams of the cross-section of the components of the prepared particles.

The carbon component is shown in black, the silicon oxide is shown in orange, the silicon component is shown in green, and the magnesium silicate is shown in blue.

<Experimental Example> EDS Photo Measurement Before and After Charge/Discharge

Figure 16:
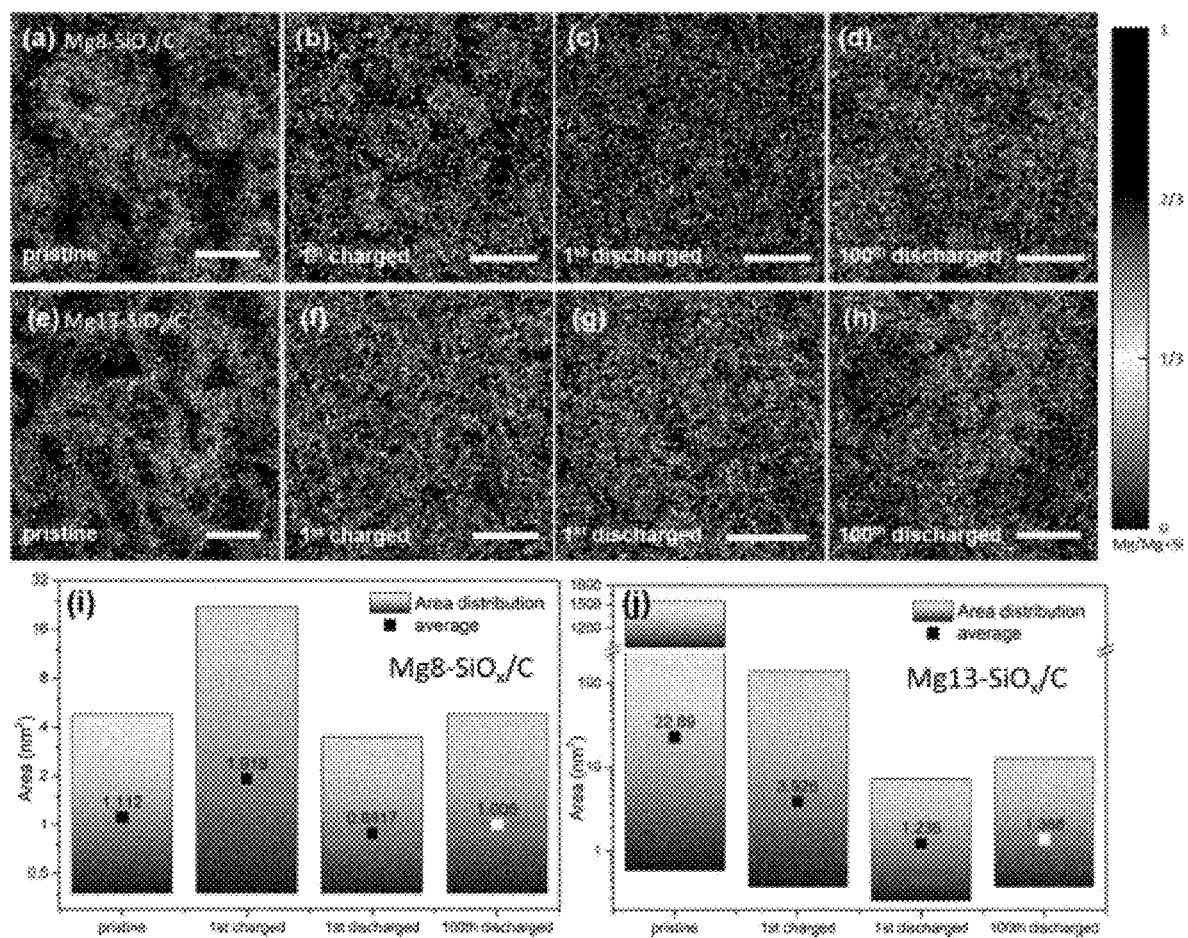
FIG. 16 shows the TEM, STEM-HAADF, and STEM-EDS measurement results before and after charge/discharge of a battery including an anode material of an embodiment and a Comparative Example of the present disclosure.

EDX was measured for the cells including the particles of Example 1, Example 2, and Comparative Example 3 after one charge/discharge and after 100 cycles of charge/discharge, and the results are shown in FIG. 16.

In the case of Example 1 in which the Mg content was 8%, the particles aggregated in the form of $Mg_xSiO_y$ around the Si core after one cycle of charge/discharge as shown in FIGS. 16(a) to 16(d), $Mg_xSiO_y$ was evenly distributed within the particles and became stable after 100 cycles of charge/discharge. In contrast, as shown in FIGS. 16(e) to 16(h), in the case of Comparative Example 1, it could be seen that the $Mg_xSiO_y$ and Si domains were formed to be large from the beginning, and the lifetime characteristics were deteriorated due to the change in volume according to charge/discharge due to the structural change to obtain a stable form.

Figure 17:
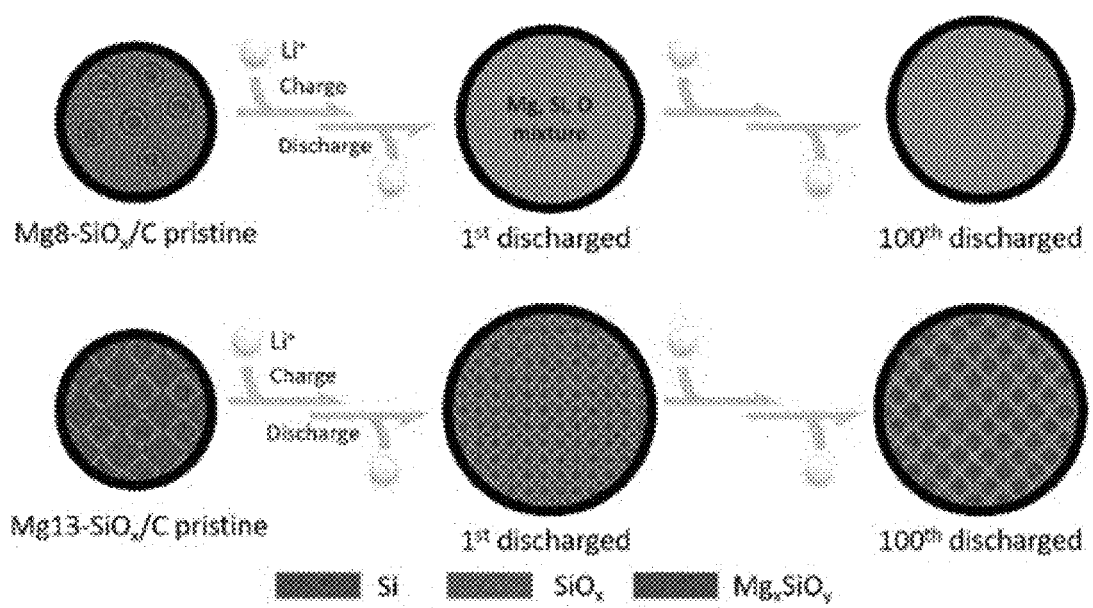
FIG. 17 shows the schematic diagrams showing a change in the structure of a battery, before and after charge/discharge, which includes an anode material of an Example and Comparative Example 3 of the present disclosure.

Such structural changes are schematically shown in FIG. 17.

As such, specific parts of the present disclosure have been described in detail, it will be apparent to those of ordinary skill in the art that these specific descriptions are merely preferred embodiments, and the scope of the present disclosure is not limited by these embodiments. Accordingly, the actual scope of the present disclosure will be defined by the appended claims and the equivalents thereof.

What is claimed is:

1. A silicon oxide composite for a lithium secondary battery anode material, comprising:
    a Si cluster; and
    magnesium silicate, which is indicated as MgxSiOy ($0.5 \leq x \leq 2$, $2.5 \leq y \leq 4$), formed on a peripheral portion of the Si cluster, wherein the Si; cluster and the $Mg_xSiO_y$ ($0.5 \leq x \leq 2$, $2.5 \leq y \leq 4$) formed on a peripheral portion of the Si cluster form a core-shell structure, wherein the Si cluster is prepared by using a Si/SiO$_x$/SiO$_2$ raw material powder mixture, and wherein the silicon oxide composite comprises Mg in a ratio of 2 to 10 parts by weight relative to 100 parts by weight of the total weight of the silicon oxide composite.

2. The silicon oxide composite of claim 1, wherein the domain size of the Si (220) by the Si cluster is 12 nm or less.

3. The silicon oxide composite of claim 1, wherein in X-ray diffraction pattern analysis, a peak belonging to a Si crystal appears in a range of a diffraction angle $28°<2\theta<29°$, and wherein a peak belonging to a MgSiO$_3$ crystal appears in a range of a diffraction angle $30.5°<2\theta<31.5°$.

4. The silicon oxide composite of claim 1, wherein in XRD analysis, full width at half maximum (FWHM) of Si (111) by the Si cluster is in a range of a 0.7 (deg) to 1.5 (deg).

5. The silicon oxide composite of claim 1, wherein the silicon oxide composite comprises a Mg$_2$SiO$_4$ (foresterite) crystal, and the content of the Mg$_2$SiO$_4$ (foresterite) crystal is smaller than that of a MgSiO$_3$ (enstatite) crystal.

6. The silicon oxide composite of claim 1, wherein the peak intensity ratio between the Mg$_2$SiO$_4$ (foresterite) crystal phase and the MgSiO$_3$ (enstatite) crystal phase ($I_{Mg2SiO4}/I_{MgSiO3}$) is in a range of 0 to 0.5 or less.

7. The silicon oxide composite of claim 1, wherein the silicon oxide composite comprises a carbon film on the surface.

8. The silicon oxide composite of claim 7, wherein an average thickness of the carbon film is in a range of 5 nm to 100 nm.

9. An anode for a lithium secondary battery provided with the silicon oxide composite for a secondary battery anode material according to claim 1.

10. The anode for a lithium secondary battery of claim 9, wherein when the battery is charged twice, the peak in the vicinity of 0.45 V in the dQ/dV curve is greater than that at 0.25 V.

11. The anode for a lithium secondary battery of claim 10, wherein after the battery is discharged twice, the XRD peak derived from Mg$_x$SiO$_y$ does not appear.

12. A lithium secondary battery, which comprises the anode for a lithium secondary battery provided with a silicon oxide composite for a secondary battery anode material of claim 9.

* * * * *